United States Patent [19]
Schintag et al.

[11] Patent Number: 5,668,331
[45] Date of Patent: Sep. 16, 1997

[54] POSITION SENSOR

[75] Inventors: Peter Schintag, Gifhorn; Thomas Suwald, Hamburg, both of Germany

[73] Assignee: U.S. Philips Corporation, New York, N.Y.

[21] Appl. No.: 698,416

[22] Filed: Aug. 15, 1996

[30] Foreign Application Priority Data

Aug. 18, 1995 [DE] Germany .................. 195 30 386.5

[51] Int. Cl.$^6$ ................ G01D 5/16; G01D 5/20; G01D 5/26; G01B 21/00
[52] U.S. Cl. .............. 73/865.9; 356/375; 324/207.2; 324/207.21
[58] Field of Search ................ 73/865.9, 132; 137/554; 250/554.29; 356/375; 324/207.2, 207.21

[56] References Cited

U.S. PATENT DOCUMENTS

| 4,295,085 | 10/1981 | Lafuze ................ 318/721 |
| 4,754,220 | 6/1988 | Shimizu et al. ......... 324/207.18 |
| 5,068,529 | 11/1991 | Ohno et al. ............ 250/231.18 |
| 5,106,192 | 4/1992 | Tucker et al. .......... 356/349 |
| 5,208,535 | 5/1993 | Nakayama et al. ....... 324/318 |
| 5,523,900 | 6/1996 | Kosugi et al. ......... 360/77.05 |

FOREIGN PATENT DOCUMENTS

| 0217478B1 | 7/1991 | European Pat. Off. | |
| 484242 | 5/1992 | European Pat. Off. | ......... 324/207.21 |
| 575971 | 12/1993 | European Pat. Off. | ......... 324/207.2 |
| 32118 | 2/1989 | Japan | ........................ 324/207.21 |
| 2164157 | 3/1986 | United Kingdom | ......... 324/207.2 |

OTHER PUBLICATIONS

*Patent Abstracts of Japan* Grp P1373, vol. 16, No. 272 Absp–b date Jun. 18, 1992 (4–70510)"Detecting Apparatus of Rotating Position".

*Patent Abstracts of Japan* Grp E 1476 vol. 17, No. 680 Abs p–5 date Dec. 14, 1993 (5–227719) "Brushless Motor".

*Patent Abstracts of Japan* copyright 1995 (7–49669) dated Feb. 21, 1995 "Method for Detecting Coordinate Position of Matrix Panel".

*Primary Examiner*—Thomas P. Noland
*Attorney, Agent, or Firm*—Michael E. Marion

[57] ABSTRACT

The invention relates to a position sensor including at least two sensor units which measure in a contactless manner a position x of an element which is movably arranged relative to the sensor units. Using limited circuitry, the invention precludes sources of errors during the processing of the sensor signals in that from the sensor signals there is formed a measuring signal from the phase position of which relative to the clock signal there can be determined the position x. The position x may be, for example an angle or a length position.

18 Claims, 5 Drawing Sheets

POSITION SENSOR

BACKGROUND OF THE INVENTION

1. Field of the Invention

The invention relates to a position sensor including at least two sensor units which measure in a contactless manner and whose sensor signals constitute similar, mutually phase-shifted functions of the position x to be measured relative to a movable element, and also including a phase detection unit for forming a position sensor signal which is a measure of the position x.

2 Discussion of the Related Art

Position sensors are used, for example for determining an angle of an element which is arranged so as to be rotatable with respect to the sensor units, or for determining the longitudinal position of an element which is slidable with respect to the sensor elements.

A position sensor for determining an angle $\alpha$ is known from EP-B 217 478. Therein, two sensor units which are constructed as magnetic films are fed, via two switches, with two 90° phase-shifted sinusoidal alternating current signals from a sine-wave generator. The measured output voltages of the two magnetic films are separately applied, via a respective switch, to a comparator whose output is connected to a signal processing device for calculating the angle $\alpha$.

In the above arrangement measuring inaccuracies occur because of phase and amplitude errors of the sinusoidal input signals of the sensor units. A further problem consists in the separate feeding of the two output signals of the sensor units. On the one hand, any amplifiers and filters present in each channel do not have exactly the same gain and filter characteristic and on the other hand errors due to unequal weighting of the two output signals upon combination could degrade the measuring accuracy.

SUMMARY OF THE INVENTION

Therefore, it is an object of the invention to construct a position sensor of the kind set forth in such a manner that such error sources are avoided without using complex circuit means.

This object is achieved in accordance with the invention in that a combination circuit which is controlled by a clock signal generates from the sensor signals a measuring signal which corresponds to a cyclic order of the sensor signals with a polarity which changes after each cycle, and that the phase detection unit forms the position sensor signal by measuring the phase difference between the clock signal and the measuring signal. As a result of such combination of the sensor signals immediately behind to the outputs of the sensor units on the one hand the number of structural elements required is reduced whereas on the other hand potential error sources, leading to measuring inaccuracies, are thus precluded.

The invention is based on the recognition of the fact that the measuring signal is a step signal and that the phase position of a signal formed therefrom is determined by the height and the order of the steps. The position x to be determined can be deduced from this phase position by phase comparison with a reference signal (for example, the clock signal).

The combination circuit in a preferred embodiment supplies the sensor units with a direct current or a direct voltage and includes a switching unit for forming the measuring signal from the sensor signals. The sensor units can thus be particularly simply fed, because all sensor units can be fed from the same direct current source or direct voltage source. The formation of the measuring signal by means of a switching unit, comprising multiplexers controlled by the clock signal in a further embodiment of the invention, is then also very simple.

The combination circuit in an alternative embodiment of the invention includes a switching device for feeding the sensor units in such a manner that they receive, in a cyclic order, a direct current signal or a direct voltage signal whose polarity changes after each cycle. In this embodiment it is again ensured that the measuring signal corresponds to a cyclic order of the sensor signals with a polarity which changes after each cycle, for which purpose the outputs of the sensor units are simply combined.

In a preferred embodiment of the invention, the phase detection unit includes a low-pass filter, a comparator which succeeds the low-pass filter, and a phase comparator which succeeds the comparator. The low-pass filter filters the fundamental wave from the stepped measuring signal. The comparator produces a square-wave signal from the sinusoidal output signal of the low-pass filter. The phase comparator measures the phase difference between this signal and the clock signal and generates a position sensor signal which is proportional to said phase difference and hence to the position x.

The sensor units in a particularly attractive embodiment of the invention are magnetoresistive sensors, each of which consists of four bridge elements. The expenditure for the magnet system acting on the sensor units is then small. Moreover, when the sensor units are suitably interleaved, they will exhibit a similar phase-shifted behavior. Position sensors of this kind are particularly suitable for use as angle sensors.

Alternatively, in accordance with the invention the sensor units are Hall elements or optical sensor elements. The operation of Hall elements is based on the Hall effect. Optical sensor elements may be, for example, mutually rotated polarization detectors capable of detecting the linear polarization of light.

The position sensor in accordance with the invention can be used wherever the position of a component relative to a reference position or to a further component is to be measured. A possible application is that, for example as an angle sensor or a length sensor. Because of its very high measuring accuracy and low-cost manufacture, the sensor in accordance with the invention is particularly suitable for use as a position transducer in a vehicle, notably a valve position or pedal position transducer.

BRIEF DESCRIPTION OF THE DRAWINGS

The invention will be described in detail hereinafter with reference to the drawing. Therein.

DETAILED DESCRIPTION OF THE PREFERRED EMBODIMENTS

Figure 1:
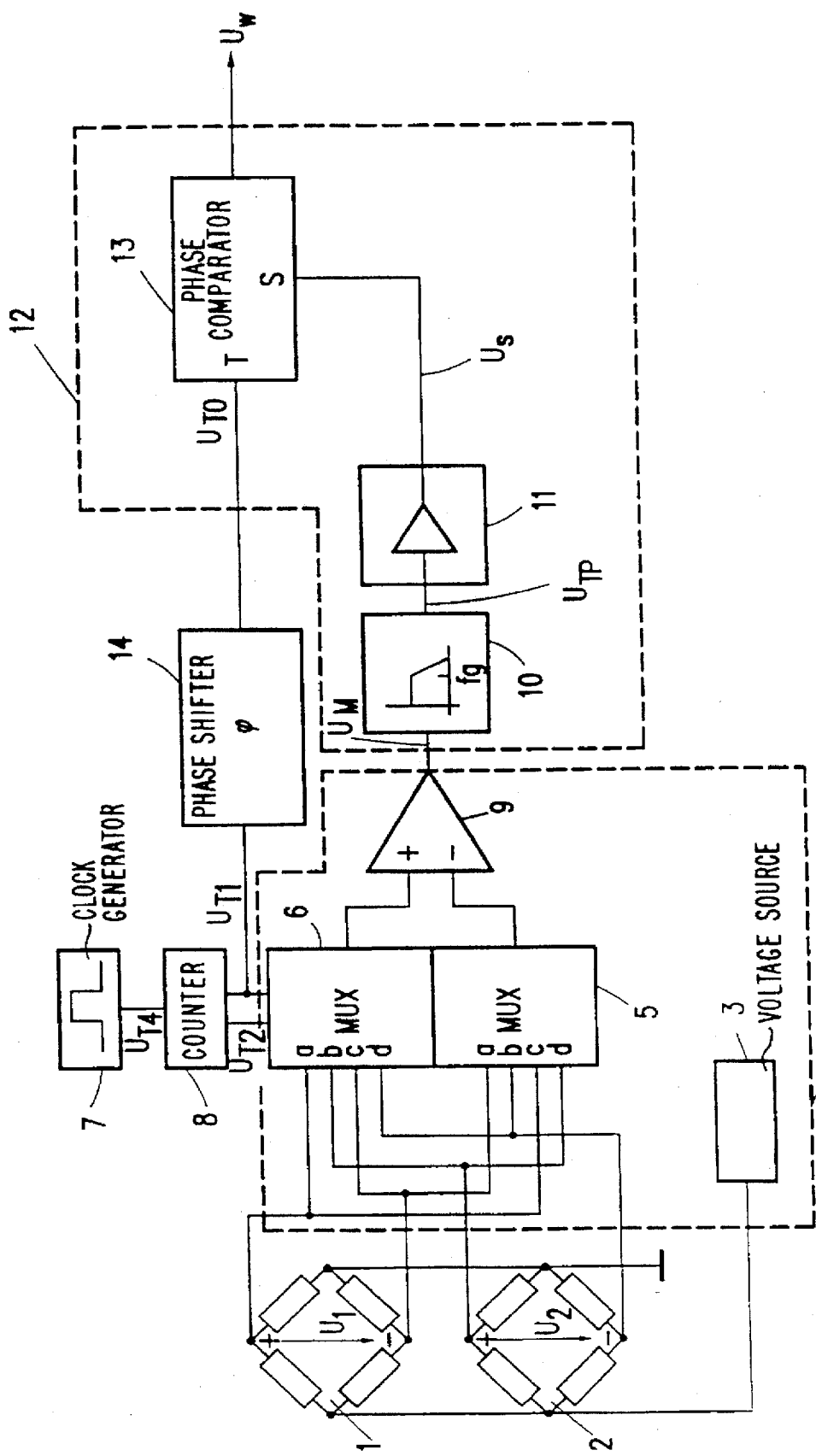
FIG. 1 shows a block diagram of a position sensor in accordance with the invention which includes two sensor units for measuring an angle $\alpha$.

FIG. 1 shows the block diagram of a position sensor in accordance with the invention for angle measurement, comprising two magnetoresistive sensors 1 and 2. Each of the sensors 1, 2 comprises four bridge elements which are interleaved and arranged annularly around a common center. Bridge elements of the sensor 1 alternate with bridge elements of the sensor 2, and each bridge element is rotated 45° with respect to the two neighbouring bridge elements. An arrangement of this kind is described, for example in European Patent Application EP-A 671605. For the sake of clarity, the sensors 1, 2 are indicated only symbolically and separately from one another.

The sensors 1, 2 are fed by a direct voltage source 3 in the combination circuit 4. The combination circuit 4 also comprises two multiplexers 5, 6 whose inputs are denoted by the references + and − and connected to the sensors 1, 2. The multiplexers 5, 6 are controlled by the clock signals $U_{T1}$ and $U_{T2}$ which are formed from the clock signal $U_{T4}$ of the clock generator 7 by the counter 8. The outputs of the multiplexers 5, 6 are connected to the input of a differential amplifier 9. The combination circuit 4 is succeeded by a phase detection unit 12 which includes, at its input, a low-pass filter 10 which is tuned to the frequency of the clock signal $U_{T1}$, a comparator 11 which succeeds the low-pass filter 10, and a phase comparator 13 which succeeds the comparator 11. Moreover, a clock input T of the phase comparator 13 carries the clock signal $U_{T0}$ which corresponds to the phase-shiftedclock signal $U_{T1}$. For phase shifting, and hence for fixing the zero point of the clock signal $U_{T1}$, the phase comparator 13 is preceded by a phase shifter 14 which receives the clock signal $U_{T1}$.

The operation of the circuit will be described in detail hereinafter. The two magnetoresistive sensors 1, 2 receive the same direct voltage signal on their inputs. Because of the arrangement of the sensors 1, 2 with bridge elements rotated 45° relative to one another, the sensor signals $U_1$ and $U_2$ on the outputs of the sensors 1, 2 are phase shifted 90° relative to one another. It holds that: $U_1=U_0\cos(2\alpha)$ and $U_2=U_0\sin(2\alpha)$. $U_0$ is a constant and $\alpha$ is the angle to be measured between a component, which includes a magnet and is rotatable relative to the sensors 1, 2, and a reference axis. The sensor signals $U_1$ and $U_2$ are applied to the input of the differential amplifier 9 by the two multiplexers 5, 6, each of which comprises four inputs and one output, in such a manner that a periodic step signal appears as the measuring signal $U_M$ on the output of the differential amplifier 9. To this end, during the first sub-period ($U_{T1}=U_{T2}=1$) the sensor signal $+U_1$ is applied from the inputs a of the multiplexers 5, 6 to the output. During the second sub-period ($U_{T1}=1$, $U_{T2}=0$), the signal $+U_2$ (inputs b) is applied, whereas in the third sub-period ($U_{T1}=0$, $U_{T2}=1$) the signal $-U_1$ (inputs c) is applied and in the fourth sub-period ($U_{T1}=U_{T2}=0$) the signal $-U_2$ (inputs d). After amplification by the differential amplifier 9, the measuring signal $U_M$ is obtained as a step signal which corresponds to a cyclic order of the sensor signals $U_1$, $U_2$ with a polarity which changes every cycle.

The low-pass filter 10, having a limit frequency corresponding to the frequency-of the clock signal $U_{T1}$, filters the fundamental wave from the measuring signal $U_M$. The phase position of the sinusoidal output signal $U_{TP}$ of the low-pass filter 10 is unambiguously determined by the height of the steps and the order of the steps of the measuring signal $U_M$. The comparator 11 converts the sinusoidal output signal $U_{TP}$ into a square-wave signal $U_S$ which has the same frequency and phase position and is subsequently applied to the signal input S of the phase comparator 13. The phase comparator 13 compares the phase position of the square-wave signal $U_S$ with the phase position of the clock signal $U_{T0}$ present on its clock input T and outputs an angle sensor signal $U_W$ which is directly proportional to the angle $\alpha$. The position sensor signal $U_W$ may be, for example a pulse-width modulated signal, a voltage, a current, a frequency or another signal which unambiguously relates to the angle $\alpha$ and is in a linear relationship therewith.

Figure 2:
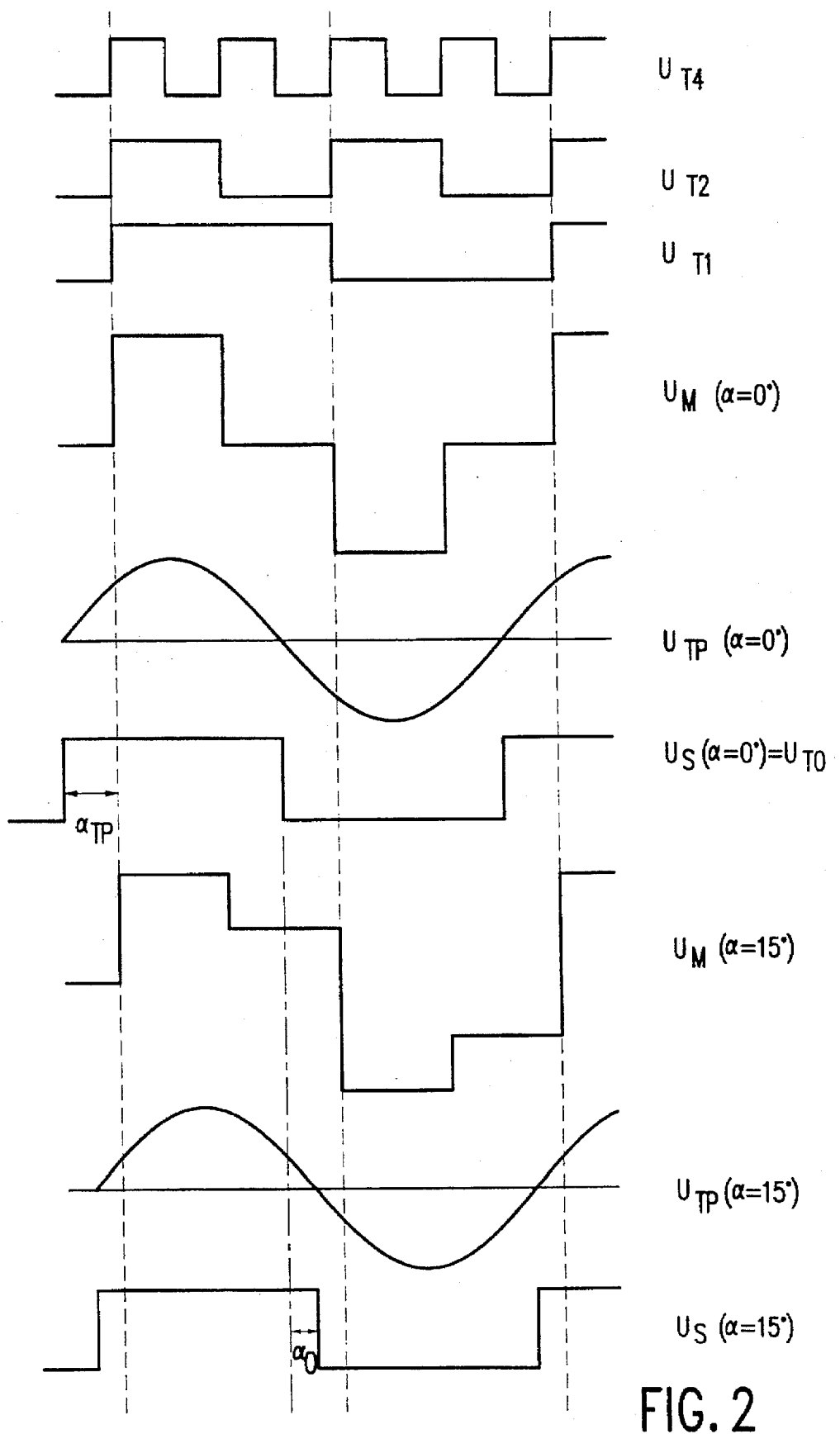
FIG. 2 shows signal patterns for two different angles $\alpha$ in a position sensor as shown in FIG. 1.

FIG. 2 shows signal patterns for two different angles $\alpha$ as occurring in a position sensor as shown in FIG. 1 when used as an angle sensor. First of all, the clock signal $U_T$ of the clock generator 7 and the clock signals $U_{T2}$ and $U_{T1}$ derived therefrom by the counter 8 are shown. Therebelow the output signals of the combination circuit 4, the low-pass filter 10 and the comparator 11 are shown first for the angle $\alpha=0°$ and subsequently for the angle $\alpha=15°$, no scale division being shown for the vertical axis.

For the angle $\alpha=0°$ it holds that: $U_1=U_0\cos0°=U_0$ and $U_1=U_0\sin0°=0$. Therefore, the signal pattern denoted by the reference $U_M$ ($\alpha=0°$) is obtained for the output signal of the combination circuit 4 (=measuring signal $U_M$) which corresponds to a step signal comprising the steps $+U_1$, $+U_2$, $-U_1$, $-U_2$. The output signal $U_{TP}$ of the low-pass filter 10 corresponds to the fundamental wave of the measuring signal $U_M$. The comparator 11 converts the low-pass output signal $U_{TP}$ into a square-wave signal $U_S$ which has the same frequency and phase position and is applied to the signal input S of the phase comparator 13. The low-pass filter induces a phase shift through the angle $\alpha_{TP}$ which must be taken into account for the phase comparison in the phase comparator 13. Therefore, to the clock input T of the phase comparator 13 there is applied a clock signal $U_{T0}$ which has been shifted through the angle $\alpha_{TP}$ by the phase shifter 14 and corresponds to the signal $U_S$ at an angle $\alpha=0°$ to be measured.

For the angle $\alpha=15°$, it holds that $U_1=\frac{1}{2}\sqrt{3}\ U_0$ and $U_2=\frac{1}{2}U_0$. As for the angle $\alpha=0°$, the signals $U_M$, $U_{TP}$ and $U_S$ are obtained. The signal $U_S$ now exhibits a phase shift $\alpha_0$ with respect to the clock signal $U_{T0}$ wherefrom the phase comparator 13 produces a position sensor signal $U_W$ (not shown) which unambiguously determines the value of the angle $\alpha$.

Figure 3:
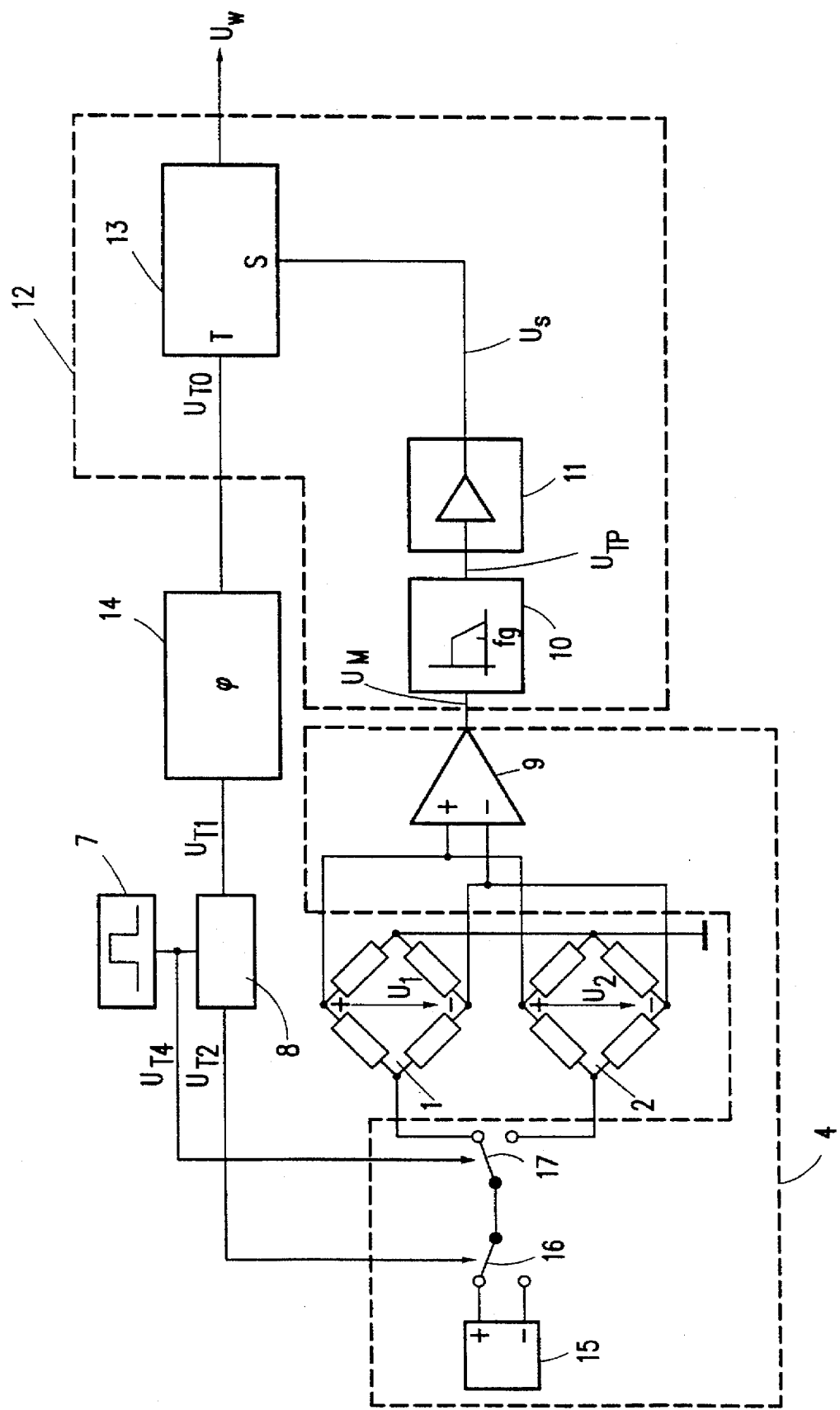
FIG. 3 shows a block diagram of an alternative embodiment of a position sensor in accordance with the invention.

FIG. 3 shows an alternative embodiment of a position sensor in accordance with the invention. The combination circuit 4 thereof has a different construction. The sensor units 1 and 2 are fed by a direct voltage source 15 via two switching elements 16, 17. The switch 16 is controlled by the clock signal $U_{T2}$ which is derived from the clock signal $U_{T4}$ by the counter 8 and has half the frequency of the clock signal $U_{T4}$. The switch 17 is controlled by the clock signal $U_{T4}$.

The clock-controlled switches 16, 17 ensure that the sensor carries a positive direct voltage during the first of four sub-periods, that the sensor 2 carries a positive direct voltage during the second sub-period, that the sensor 1 carries a negative direct voltage during the third sub-period, and that the sensor 2 carries a negative direct voltage during the fourth sub-period. The second input point of the two sensors 1, 2 continuously carries ground potential. The first input point of the sensors 1, 2 is also connected to ground during the sub-periods during which it is not connected to the direct voltage source. The output points of the sensors 1, 2 which are denoted by the reference + are combined on the positive input of the differential amplifier 9, and the output points of the sensors 1, 2 which are denoted by the reference – are applied to the negative input of the differential amplifier 9. Such simple combination is possible because the sensor 1 supplies an output signal only during the sub-periods 1 and 3 and the sensor 2 only during the sub-periods 2 and 4.

As a result of this very simple construction of the combination circuit 4, the output of the combination circuit 4 supplies the measuring signal $U_M$ which can be further processed as described with reference to the FIGS. 1 and 2.

A further embodiment (not shown) may consist of a combination of the embodiments shown in the FIGS. 1 and 3. The inputs of the sensors 1, 2 can then alternately receive a positive direct voltage via a switch. As is shown in FIG. 3, the outputs of the sensors 1, 2 are combined and applied to the inputs of a differential amplifier 9, the sign of the input gain being reversed after every second sub-period (of four sub-periods), for example by means of a multiplexer. As a result, the same measuring signal $U_M$ is obtained as in the embodiments shown in the FIGS. 1 and 3.

Figure 4:
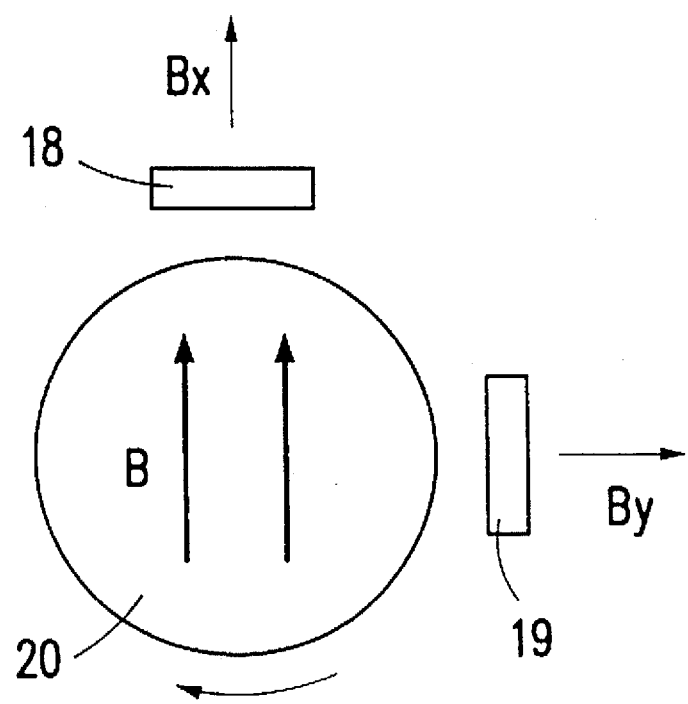
FIG. 4 shows the arrangement of two sensor units, constructed as Hall elements, relative to a magnet for angle measurement.

FIG. 4 shows the arrangement of two sensor units, constructed as Hall elements 18, 19, relative to a magnet 20 which is rotatably arranged in the plane of drawing. The magnet 20 generates a uniform magnetic field, oriented in the direction of the arrow B, at the area of the Hall sensors 18, 19, the Hall sensor 18 detecting the component $B_x$ thereof and the Hall sensor 19 the component $B_y$. The Hall sensors 18, 19 are fed with a direct current instead of a voltage; otherwise, signal processing is performed in the same way as described for the magnetoresistive sensors of the FIGS. 1 to 3.

Figure 5:
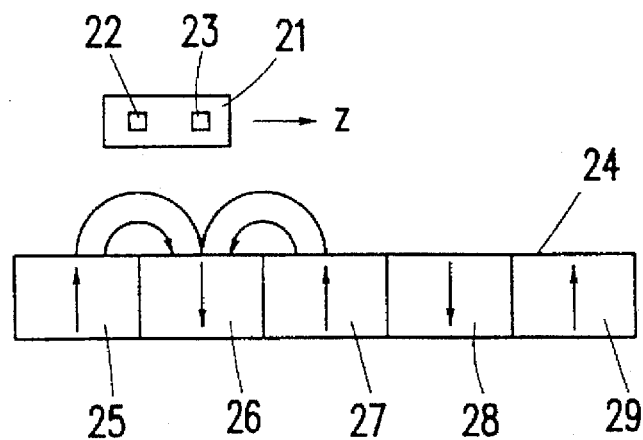
FIG. 5 shows the use of a position sensor in accordance with the invention for determining the longitudinal position.

FIG. 5 shows the arrangement of a position sensor in accordance with the invention for determining the longitudinal position z. The reference 21 denotes a position sensor which is constructed as a longitudinal sensor and includes the sensor units 22 and 23. The longitudinal sensor 21 is slidable in the z-direction with respect to the magnetically encoded scale 24. The scale 24 comprises a plurality of adjacent magnetic areas 25 to 29, the magnetic field vectors of directly neighboring areas, for example 25 and 26, always being oppositely directed. Outside the scale 24 the magnetic field denoted by a few magnetic field lines is thus obtained. The sensor units 22 and 23 detect the component of this magnetic field which is oriented in the z-direction. The sensor units 22, 23 are spaced apart in such a manner that one of these sensors detects a maximum of the components directed in the z-direction when the other one of the two sensors detects a zero position. The measured sensor signals are processed as described above, so that ultimately the position z of the longitudinal sensor 21 with respect to the scale 24 can be determined.

Figure 6:
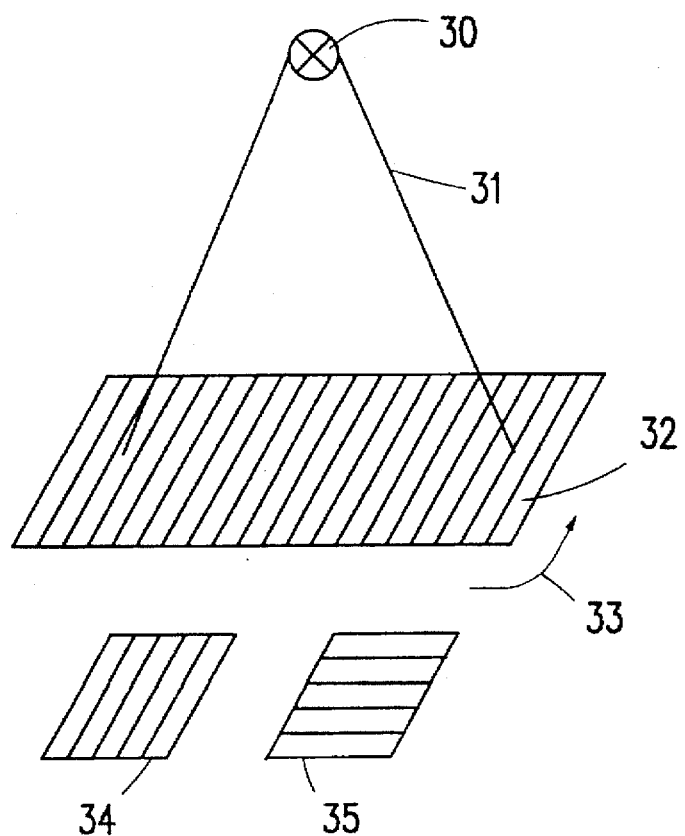
FIG. 6 shows the arrangement of two optical sensor elements for angle measurement.

The invention can also be implemented by means of optical sensors whose arrangement is shown in FIG. 6. Polarized light 31 emitted by a light source 30 is linearly polarized by a polarizer 32. Therebelow there are arranged two optical sensor elements 34 and 35, each of which is capable of detecting polarized light in a specific direction (denoted by the shading of the sensor elements 34, 35). The two sensor elements 34 and 35 are rotated 90° relative to one another. The polarizer 32 is rotatable in the plane parallel to the sensor elements 34, 35 as denoted by the arrow 33. This arrangement enables measurement of the angle of the polarizer 32 relative to the sensor elements 34, 35.

In the embodiments shown in the FIGS. 1 and 3, additionally a frequency divider may be connected to the clock input T as well as to the signal input S of the phase comparator 13, which frequency divider can reduce the frequency of the signals $U_S$ and $U_{TO}$. On the one hand, the interference radiation from the sensor is thus reduced whereas on the other hand the measuring accuracy is enhanced by averaging over a plurality of periods.

Other embodiments of the combination circuit whereby the desired measuring signal $U_M$ can be generated are also feasible. Solutions other than $+U_1, -U_2, -U_1, +U_2$ are also feasible for the order of the steps of the measuring signal $U_M$. Moreover, the invention is not restricted to position sensors comprising exactly two sensor units; exact position measurement is also possible by means of a position sensor including more than two sensor units; the described error sources can then still be avoided.

As regards the invention it is not relevant how the individual components, such as switching elements, the comparator, the phase comparator etc., are implemented. Preferably, in practice use is made of sensors whose output signal is in a sinusoidal relationship with the position to be measured. However, the use of sensors with a different functional relationship is also feasible, the output signals then being converted to a sinusoidal waveform by means of a conversion table.

The position sensor in accordance with the invention enables measurement of a position x with a high measuring accuracy. Because of the inexpensive manufacture, due to the uncomplicated circuitry, and its high accuracy, the position sensor in accordance with the invention is particularly suitable for use as a position transducer, notably a valve position transducer or a pedal position transducer for a vehicle. Further applications would be a lever position transducer or an inclination sensor for a chassis.

We claim:

1. A position sensor including:
    at least two sensor units (1, 2) which measure in a contactless manner and produce sensor signals which constitute similar, mutually phase-shifted functions of a position x to be measured relative to a movable element;
    a phase detection unit for forming a position sensor signal which is a measure of the position x; and,
    a combination circuit which is controlled by a clock signal and which generates from the sensor signals a measuring signal which corresponds to a cyclic order of the sensor signals with a polarity which changes after each cycle;
    said phase detection unit forming the position sensor signal by measuring the phase difference between the clock signal and the measuring signal.

2. A position sensor as claimed claim 1,
    where the combination circuit supplies the sensor units with a direct current or a direct voltage, and the combination circuit includes a switching unit for forming the measuring signal from the sensor signals.

3. A position sensor as claimed in claim 2, where the switching unit includes multiplexers which are controlled by the clock signal.

4. A position sensor as claimed in claim 2, where the phase detection unit includes a low-pass filter, a comparator which succeeds the low-pass filter, and a phase comparator which succeeds the comparator.

5. A position sensor as claimed in claim 2, where the sensor units include magnetoresistive elements.

6. A position sensor as claimed in claim 2, where the sensor units include Hall elements.

7. A position sensor as claimed in claim 2, where the sensor units include optical sensor elements.

8. A position sensor as claimed in claim 1,
where the combination circuit includes a switching device for feeding the sensor units in such a manner that the sensor units receive, in a cyclic order, a direct current or a direct voltage signal whose polarity changes after each cycle.

9. A position sensor as claimed in claim 8, wherein the phase detection unit includes a low-pass filter, a comparator which succeeds the low-pass filter, and a phase comparator which succeeds the comparator.

10. A position sensor as claimed in claim 4, where the sensor units include magnetoresistive elements.

11. A position sensor as claimed in claim 8, where the sensor units include Hall elements.

12. A position sensor as claimed in claim 8, where the sensor units include optical sensor elements.

13. A position sensor as claimed in claim 1, where the phase detection unit includes a low-pass filter, a comparator which succeeds the low-pass filter, and a phase comparator which succeeds the comparator.

14. A position sensor as claimed in claim 1, where the sensor units include magnetoresistive elements.

15. A position sensor as claimed in claim 1, where the sensor units are Hall elements.

16. A valve position transducer including a position sensor as claimed in claim 1.

17. A pedal position transducer including a position sensor as claimed in claim 1.

18. A position sensor as claimed in claim 1, where the sensor units include optical sensor elements.

* * * * *